(12) United States Patent
Lee et al.

(10) Patent No.: US 10,007,366 B2
(45) Date of Patent: Jun. 26, 2018

(54) TOUCH WINDOW AND DISPLAY INCLUDING THE SAME

(71) Applicant: LG INNOTEK CO., LTD., Seoul (KR)

(72) Inventors: Sang Young Lee, Seoul (KR); Tae Jin Lee, Seoul (KR); Hyun Seok Lim, Seoul (KR); Byung Youl Moon, Seoul (KR)

(73) Assignee: LG INNOTEK CO., LTD., Seoul (KR)

( * ) Notice: Subject to any disclaimer, the term of this patent is extended or adjusted under 35 U.S.C. 154(b) by 133 days.

(21) Appl. No.: 15/026,243

(22) PCT Filed: Sep. 23, 2014

(86) PCT No.: PCT/KR2014/008802
§ 371 (c)(1),
(2) Date: Mar. 30, 2016

(87) PCT Pub. No.: WO2015/050332
PCT Pub. Date: Apr. 9, 2015

(65) Prior Publication Data
US 2016/0246393 A1 Aug. 25, 2016

(30) Foreign Application Priority Data

Oct. 1, 2013 (KR) .................. 10-2013-0117559
Oct. 1, 2013 (KR) .................. 10-2013-0117560
Jan. 23, 2014 (KR) .................. 10-2014-0008163

(51) Int. Cl.
*G06F 3/041* (2006.01)
*G06F 3/044* (2006.01)

(52) U.S. Cl.
CPC .............. *G06F 3/041* (2013.01); *G06F 3/044* (2013.01); *G06F 2203/04104* (2013.01); *G06F 2203/04108* (2013.01); *G06F 2203/04112* (2013.01)

(58) Field of Classification Search
CPC .................. G06F 3/041; G06F 3/044; G06F 2203/04108; G06F 2203/04104;
(Continued)

(56) References Cited

U.S. PATENT DOCUMENTS

2009/0213090 A1* 8/2009 Mamba .................. G06F 3/044
345/174
2010/0309160 A1  12/2010 Lin
(Continued)

FOREIGN PATENT DOCUMENTS

KR  10-2011-0130298 A  12/2011
KR  10-2012-0096300 A  8/2012
(Continued)

OTHER PUBLICATIONS

International Search Report and Written Opinion dated Jan. 12, 2015 issued in Application No. PCT/KR2014/008802 (Full English Text).

*Primary Examiner* — Adam R Giesy
(74) *Attorney, Agent, or Firm* — Ked & Associates, LLP

(57) ABSTRACT

Disclosed is a touch window including a substrate, and a sensing electrode on the substrate. The sensing electrode comprises a plurality of sensing parts having directionalities different from each other.

17 Claims, 16 Drawing Sheets

(58) Field of Classification Search
CPC ........... G06F 2203/04112; G06F 3/045; G06F 2203/04106
See application file for complete search history.

(56) References Cited

U.S. PATENT DOCUMENTS

| | | |
|---|---|---|
| 2011/0141051 A1 | 6/2011 | Ryu |
| 2011/0291963 A1 | 12/2011 | Woo et al. |
| 2012/0032914 A1 | 2/2012 | Kim |
| 2012/0227259 A1* | 9/2012 | Badaye .................. G06F 3/044 29/846 |
| 2012/0267228 A1 | 10/2012 | Hong et al. |
| 2012/0319974 A1 | 12/2012 | Kim et al. |
| 2013/0082951 A1 | 4/2013 | Tanaka et al. |
| 2014/0210784 A1* | 7/2014 | Gourevitch .......... H03K 17/962 345/174 |
| 2014/0299357 A1* | 10/2014 | Nakamura .............. G06F 3/044 174/250 |
| 2014/0320763 A1 | 10/2014 | Lee et al. |

FOREIGN PATENT DOCUMENTS

| | | |
|---|---|---|
| KR | 10-2012-0119516 A | 10/2012 |
| KR | 10-2013-0103193 A | 9/2013 |
| KR | 10-1304891 B1 | 9/2013 |

* cited by examiner

[Fig. 1]
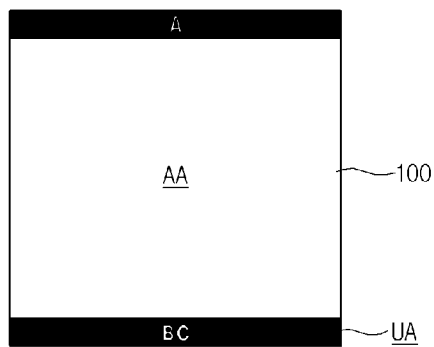
[Fig. 2]
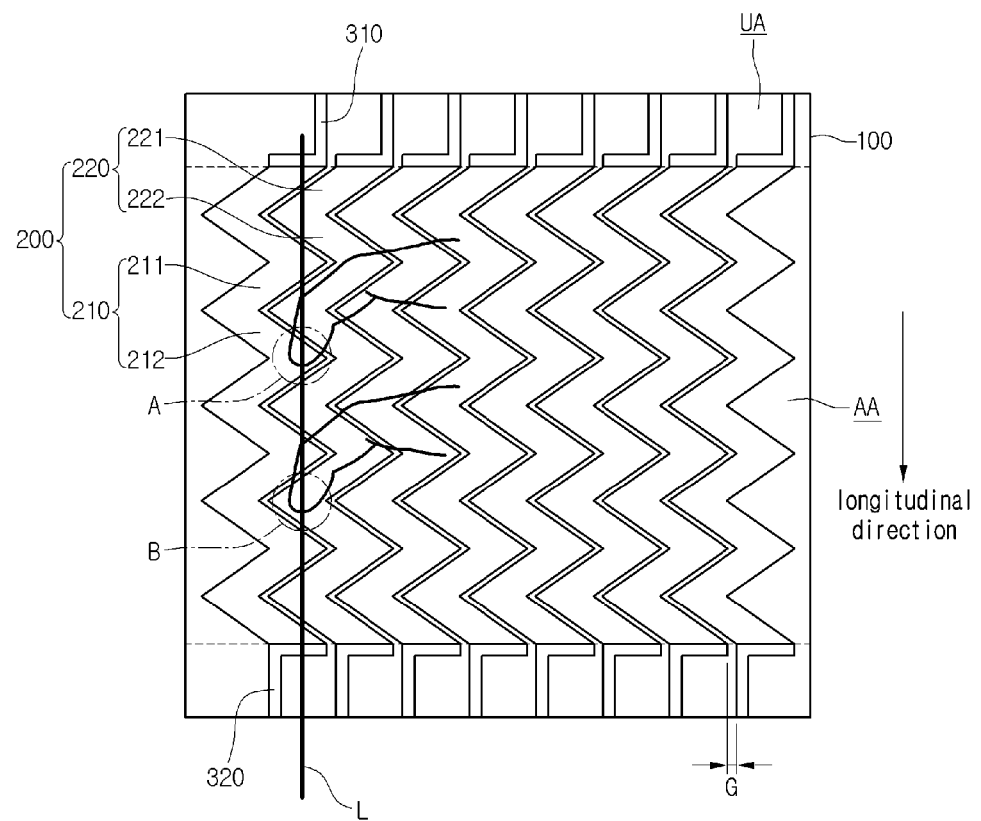

[Fig. 3]
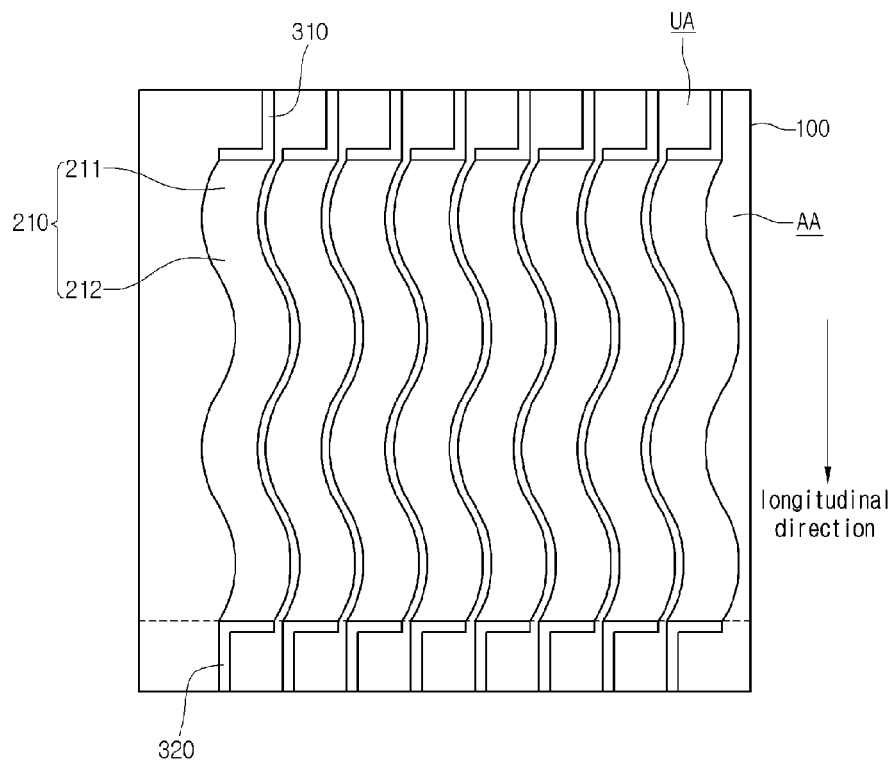
[Fig. 4]
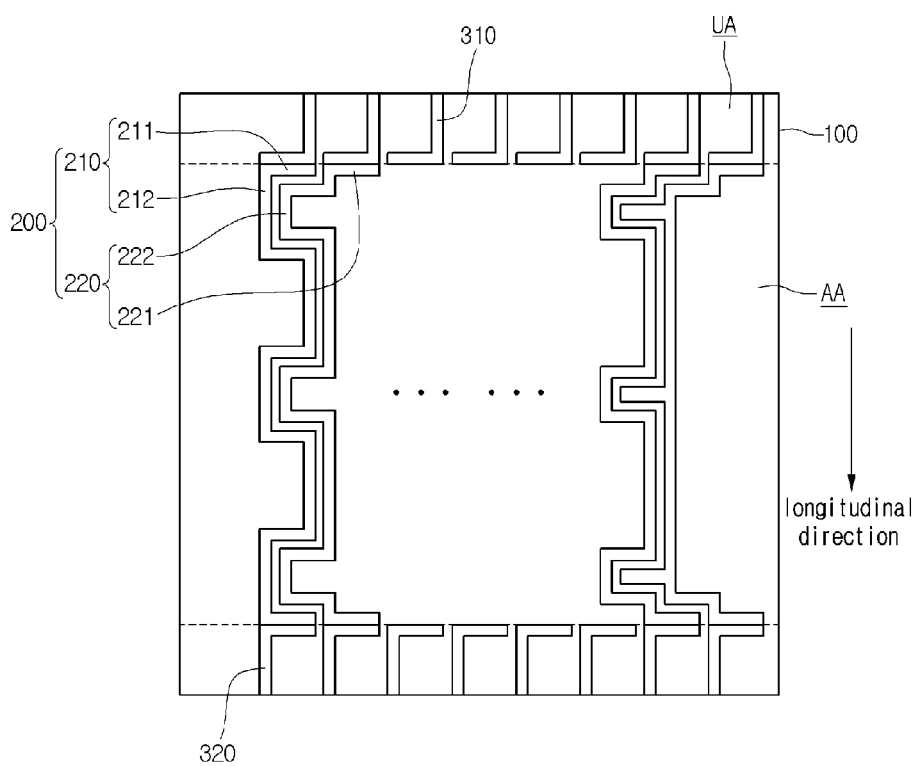

[Fig. 5]
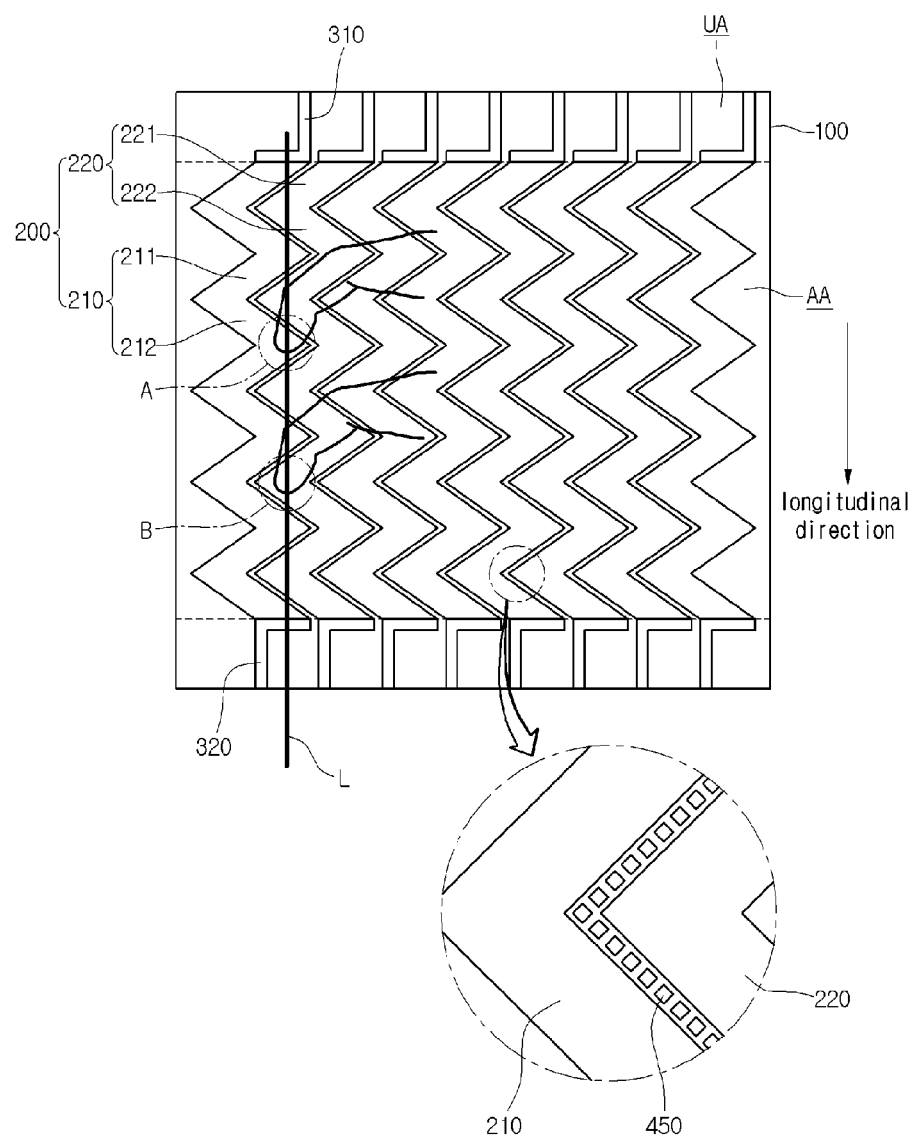

[Fig. 6]
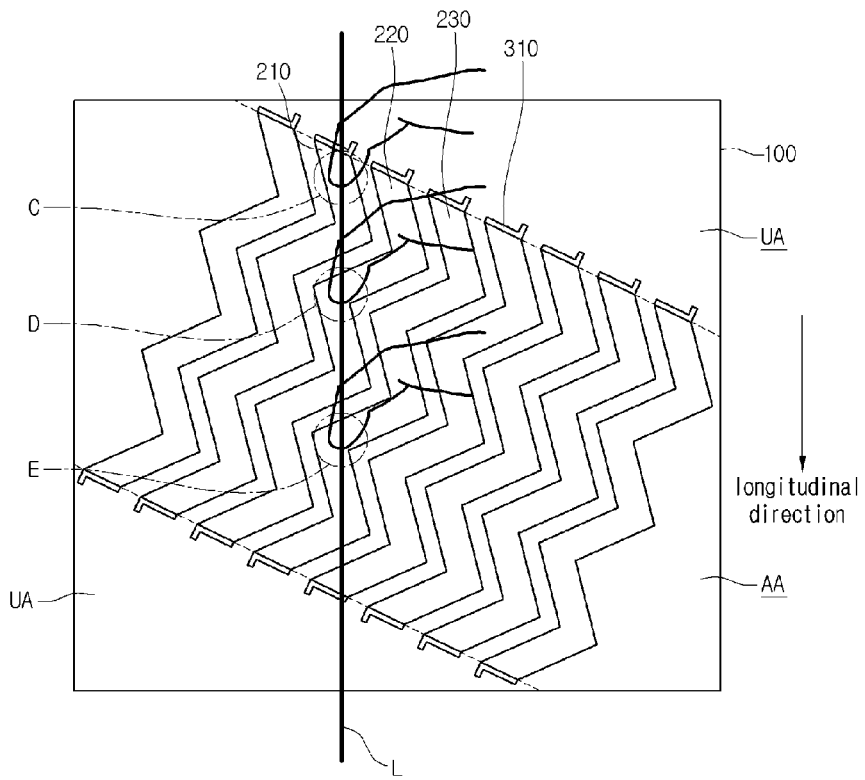
[Fig. 7]
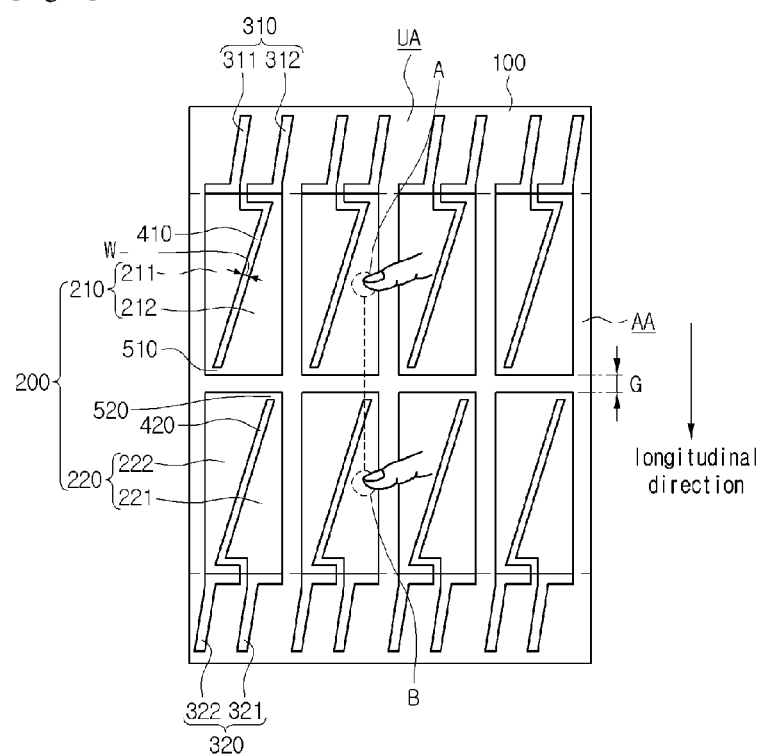

[Fig. 8]
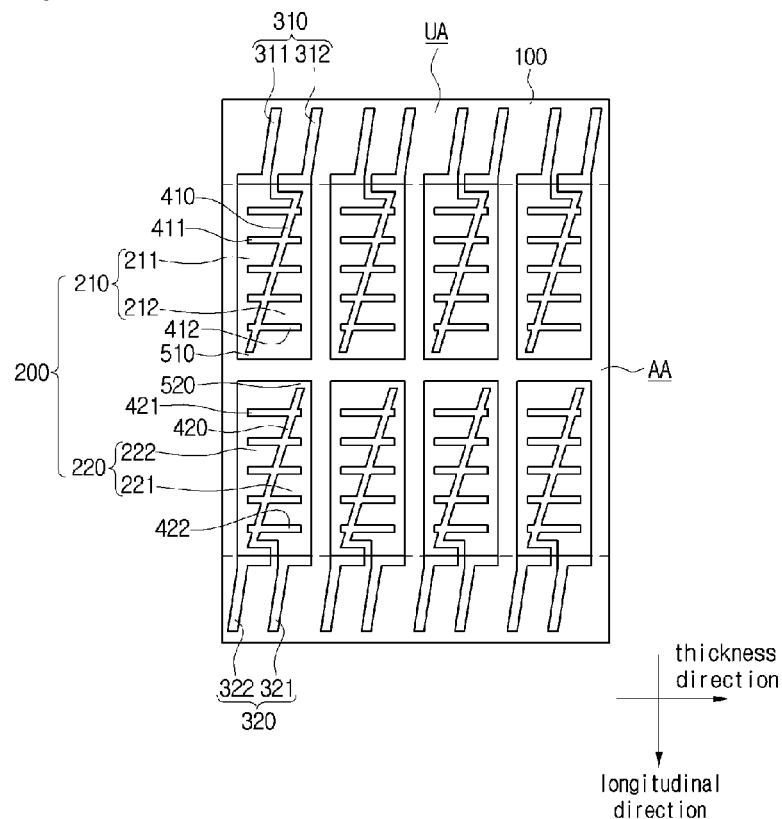
[Fig. 9]
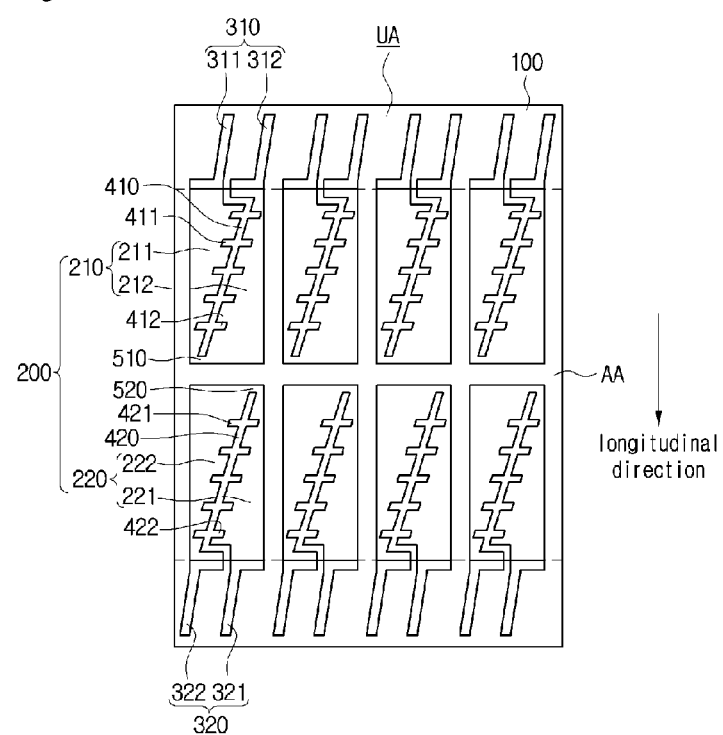

[Fig. 10]
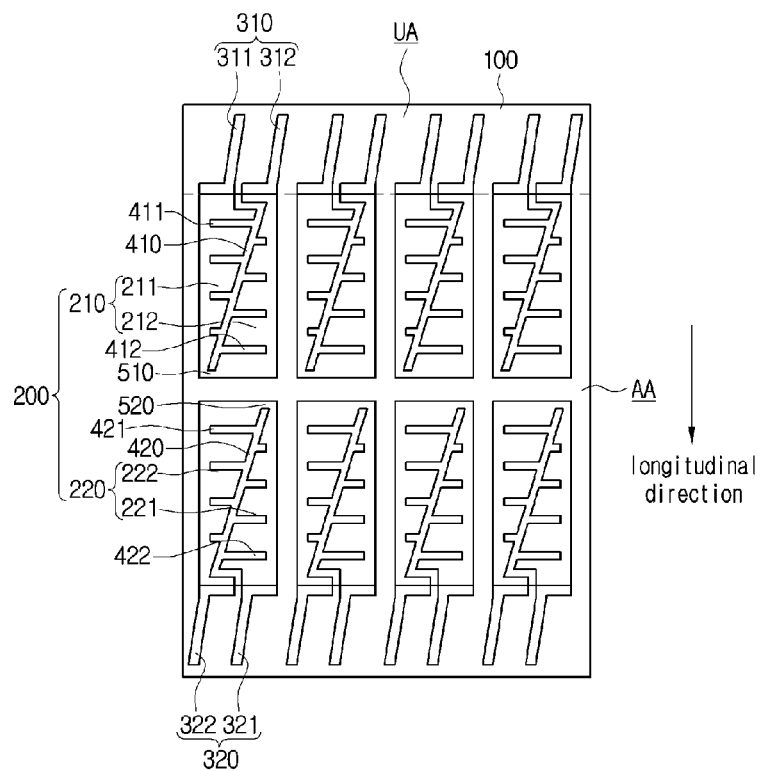
[Fig. 11]
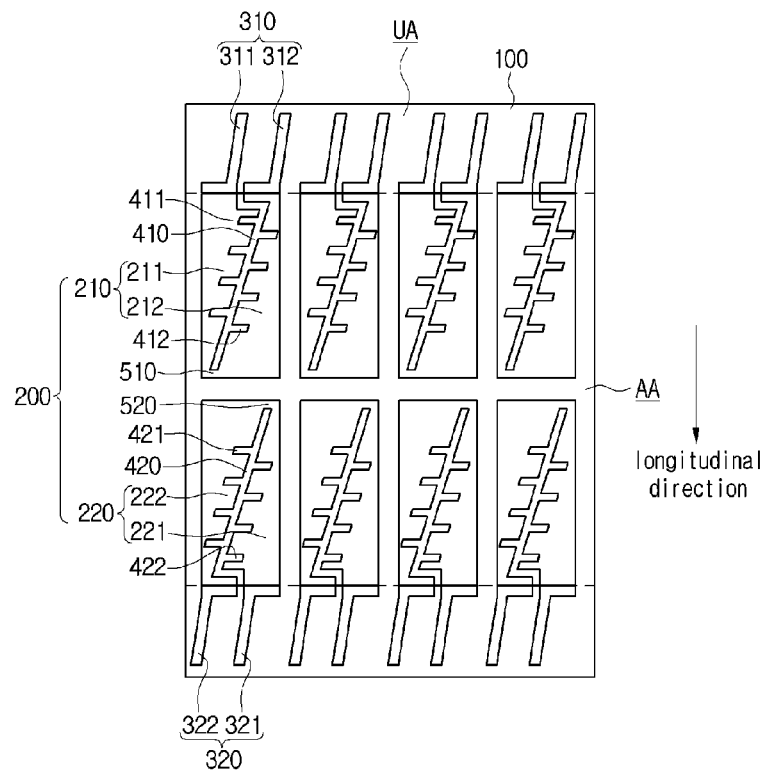

[Fig. 12]
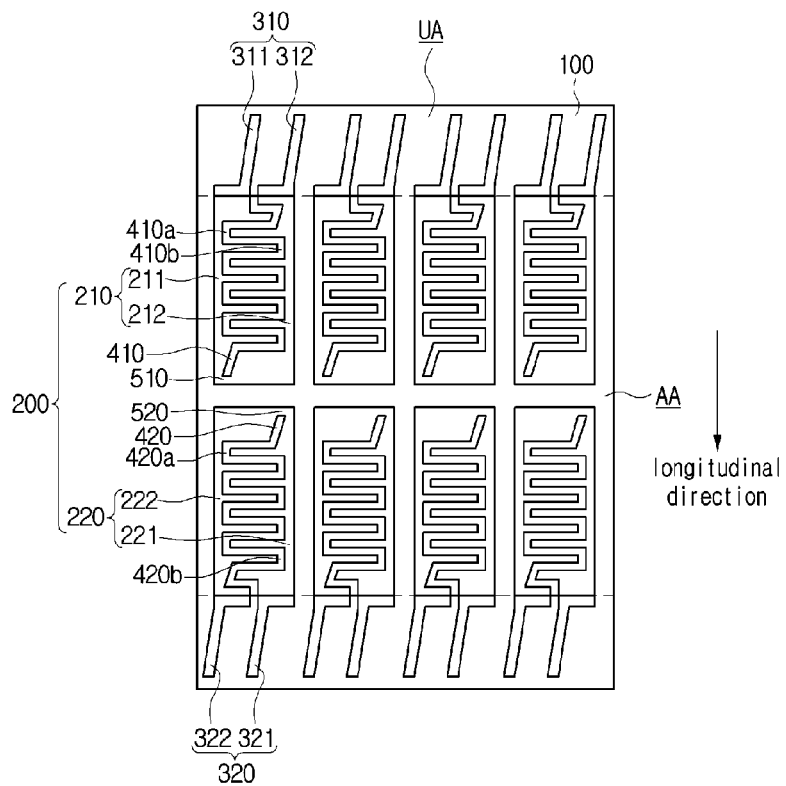
[Fig. 13]
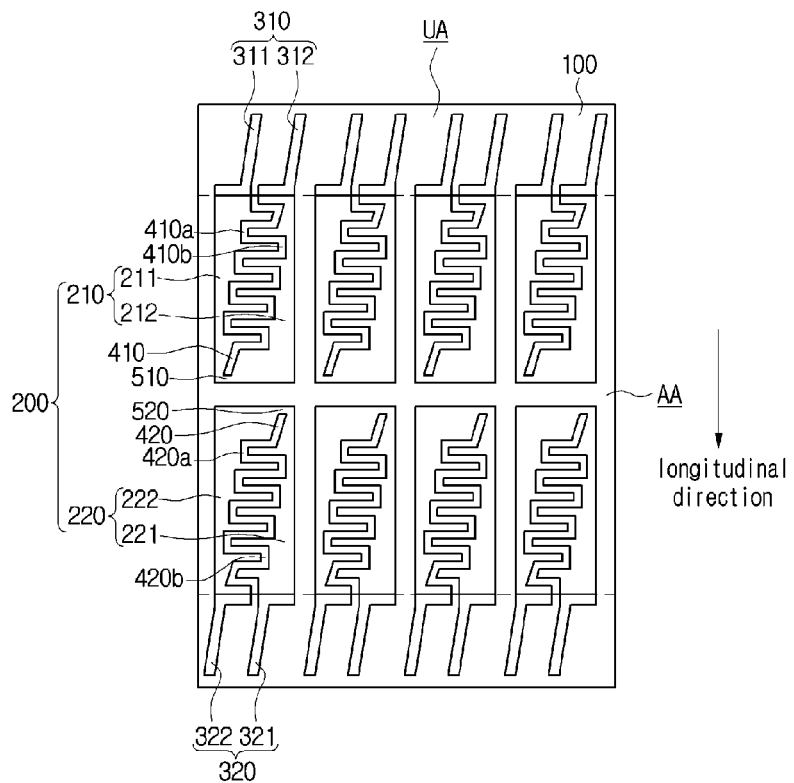

[Fig. 14]
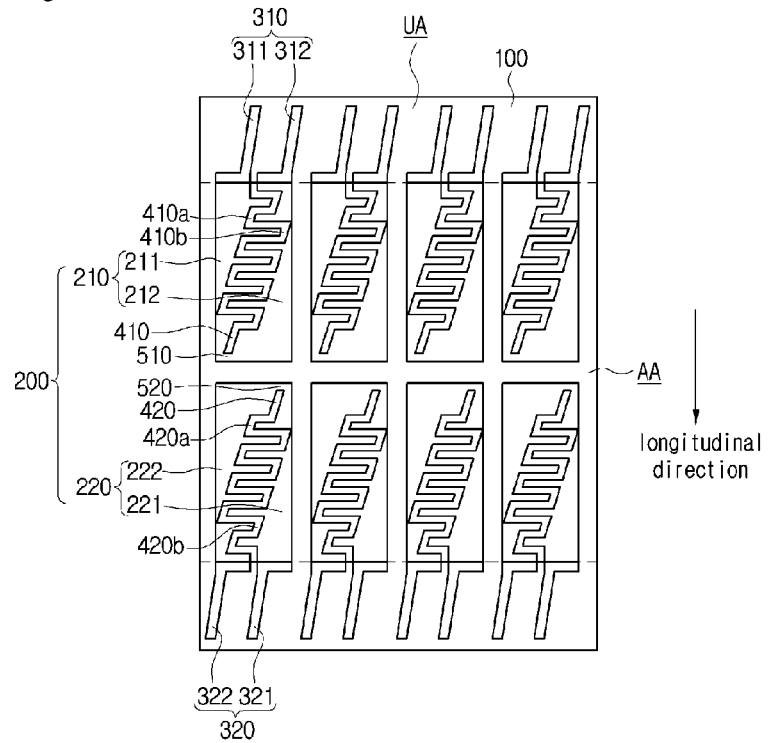
[Fig. 15]
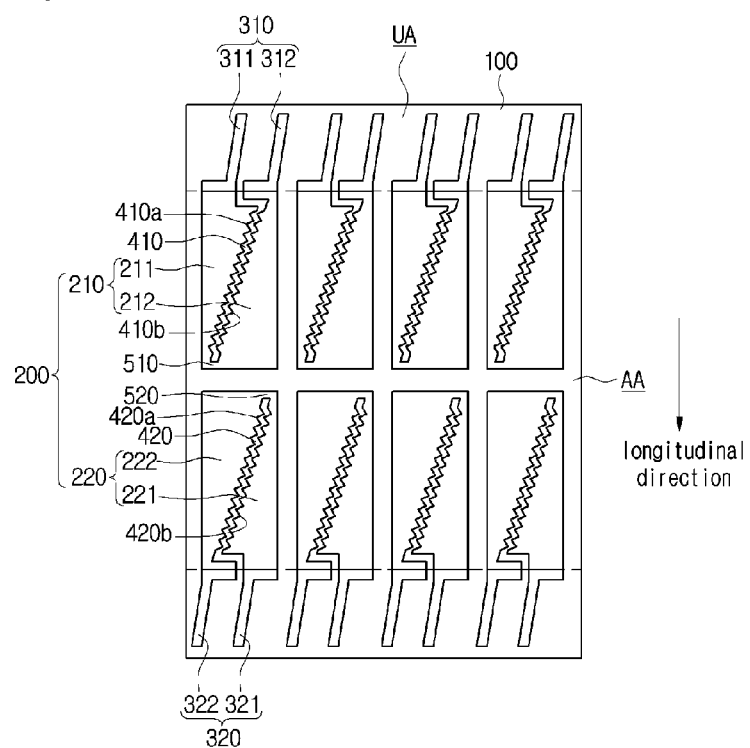

[Fig. 16]
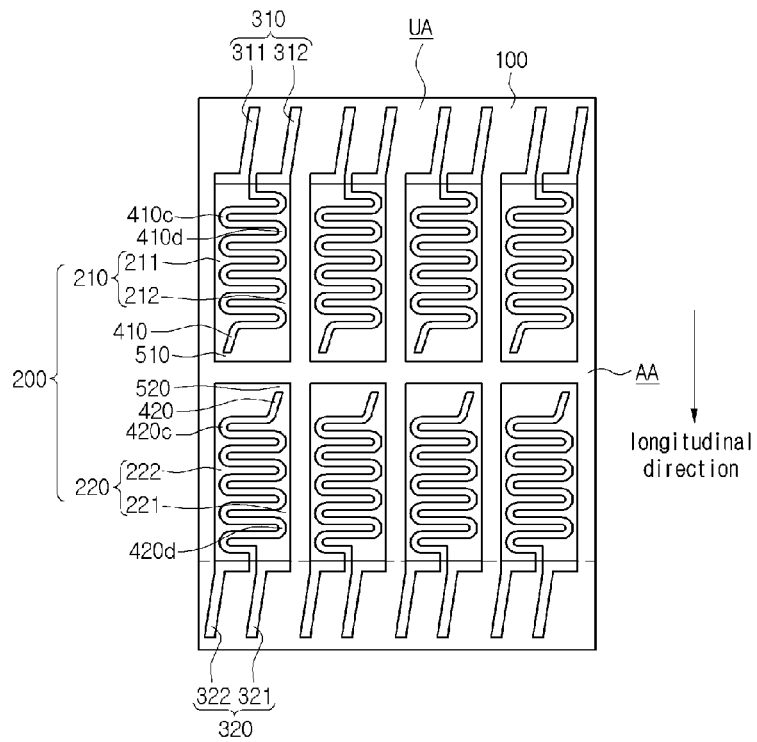
[Fig. 17]
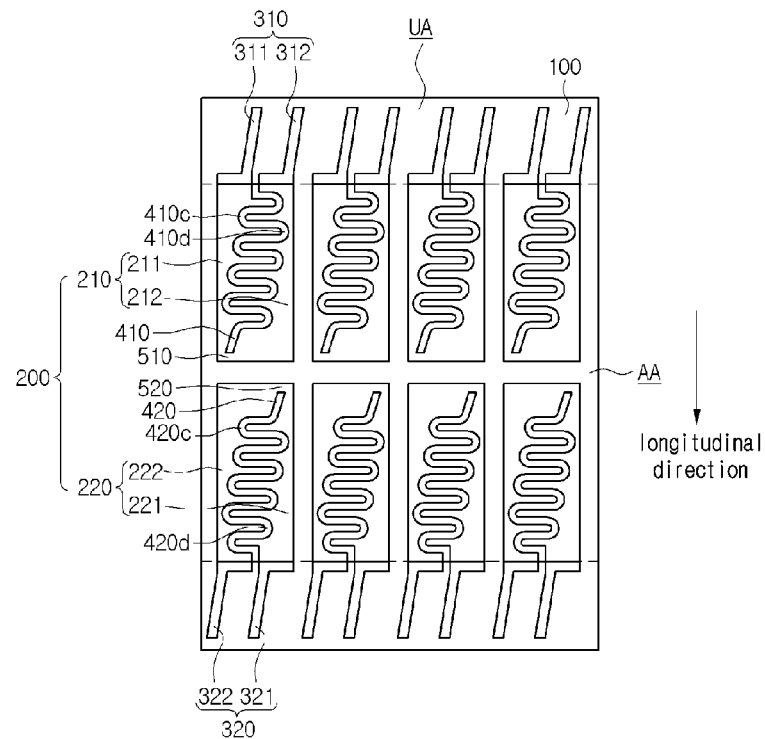

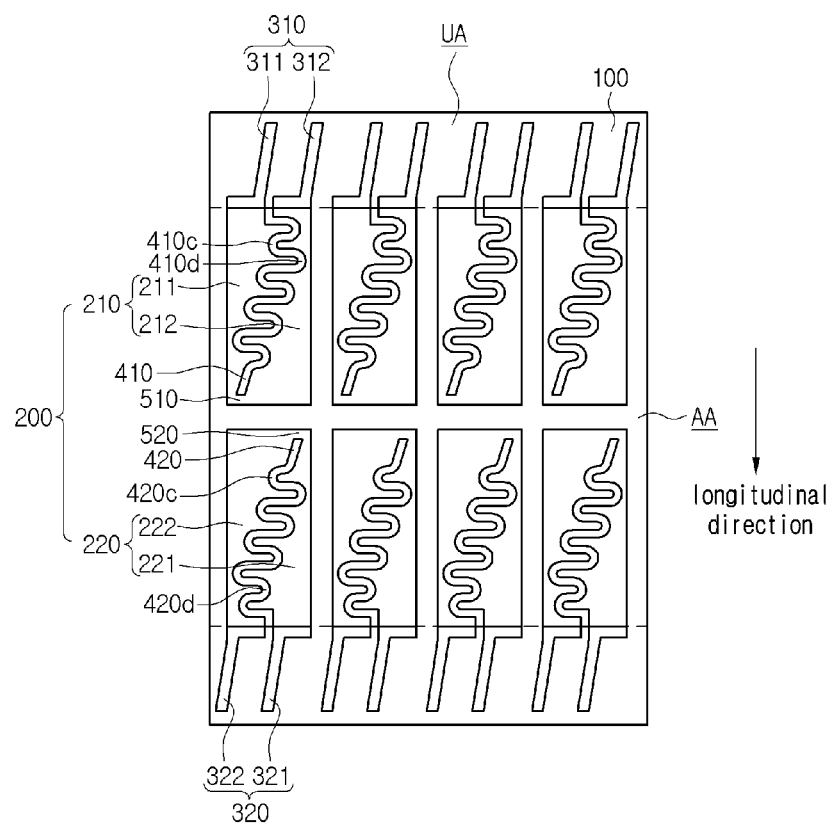

[Fig. 19]
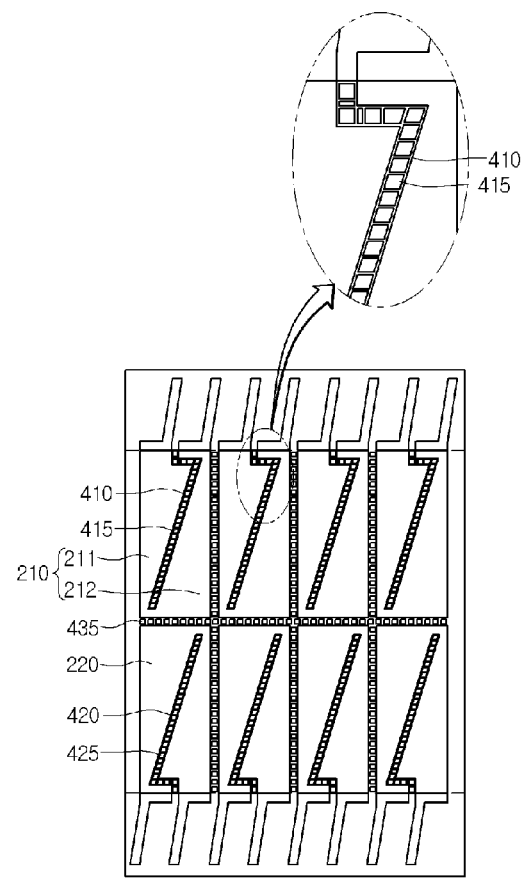
[Fig. 20]
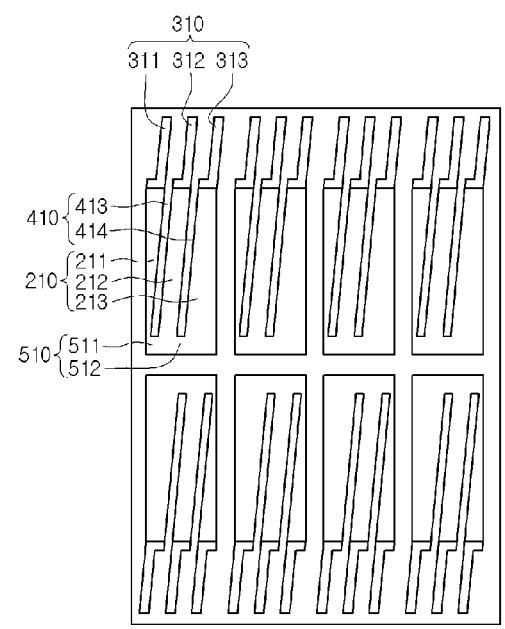

[Fig. 21]
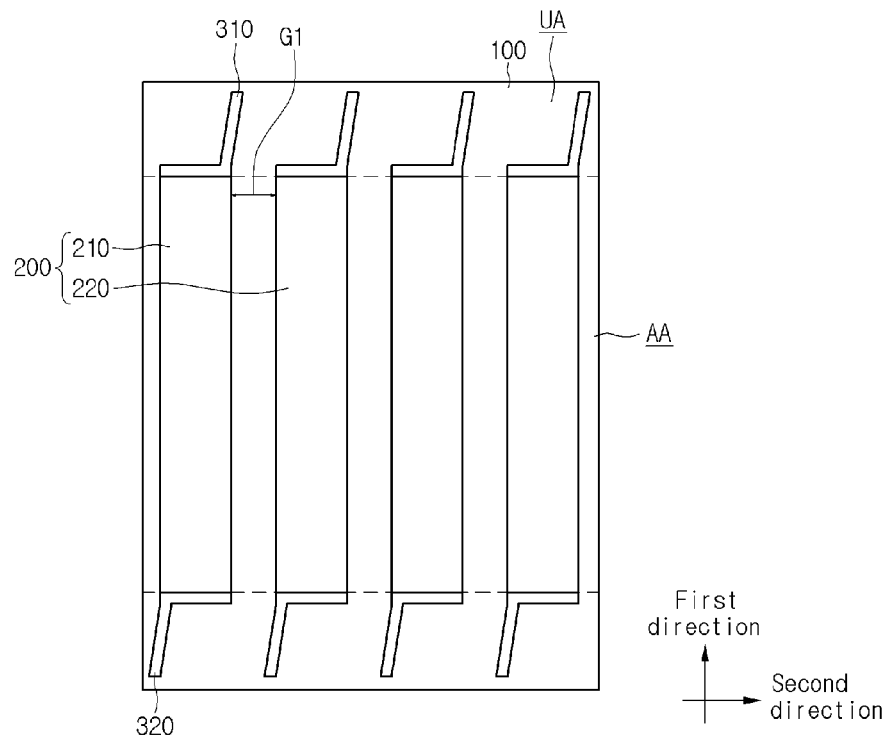
[Fig. 22]
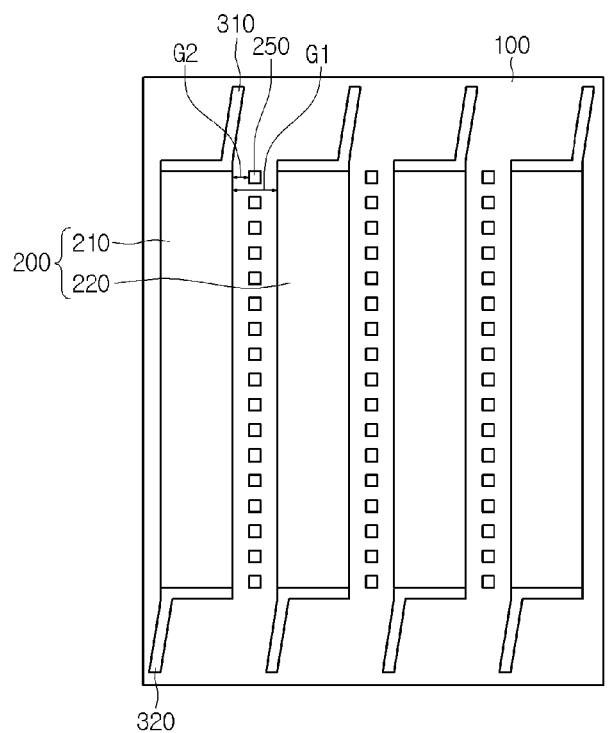

[Fig. 23]
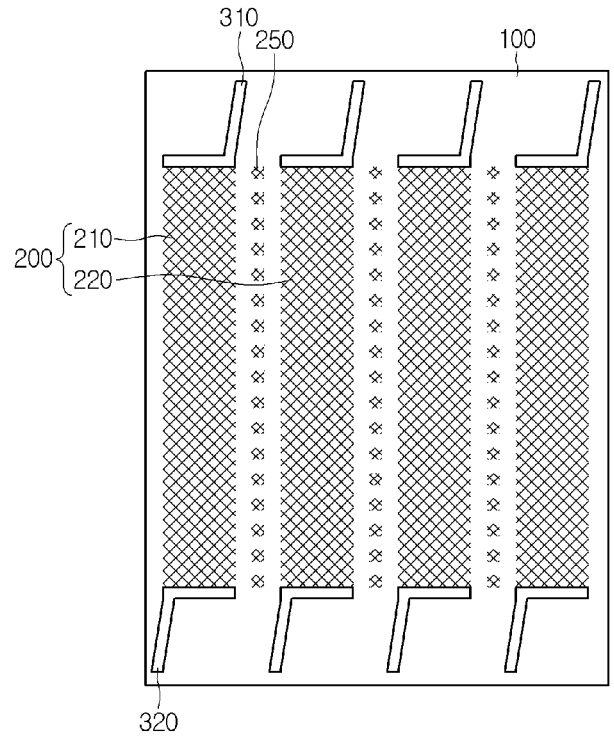
[Fig. 24]
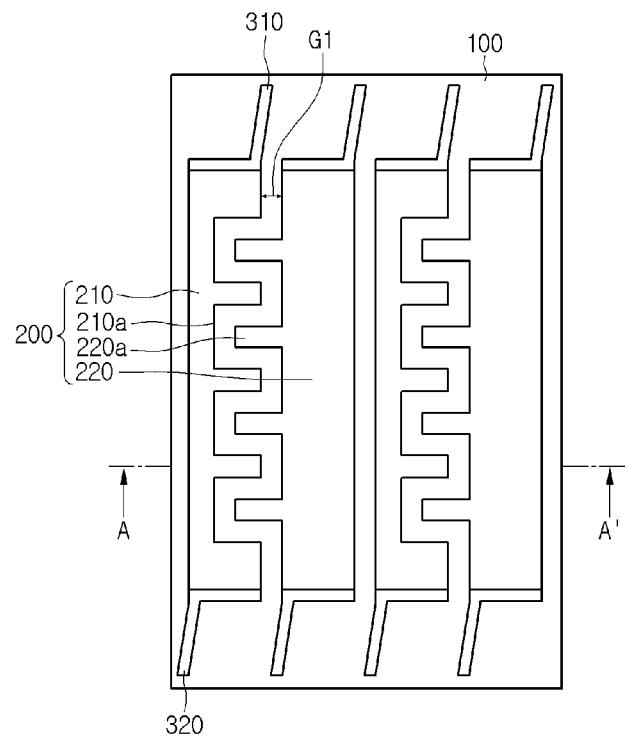

[Fig. 25]
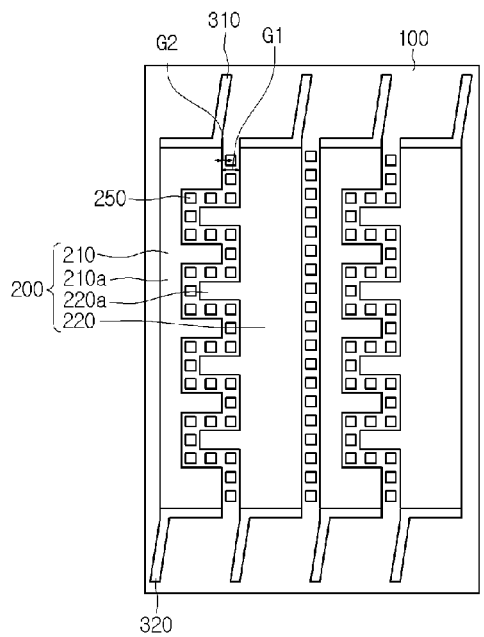
[Fig. 26]
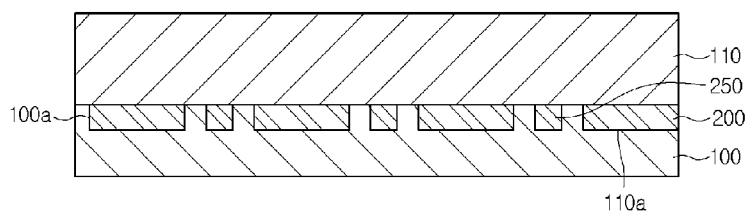
[Fig. 27]
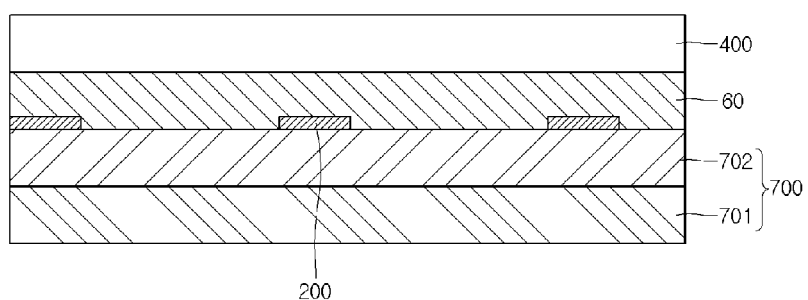
[Fig. 28]
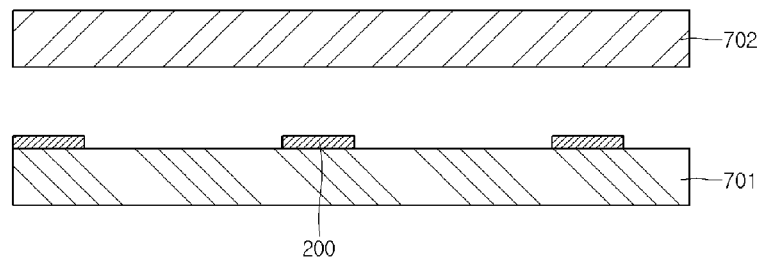

[Fig. 29]
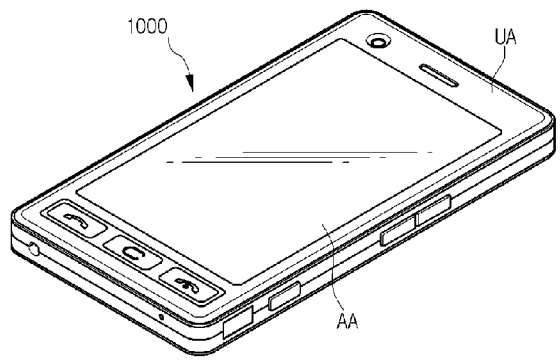
[Fig. 30]
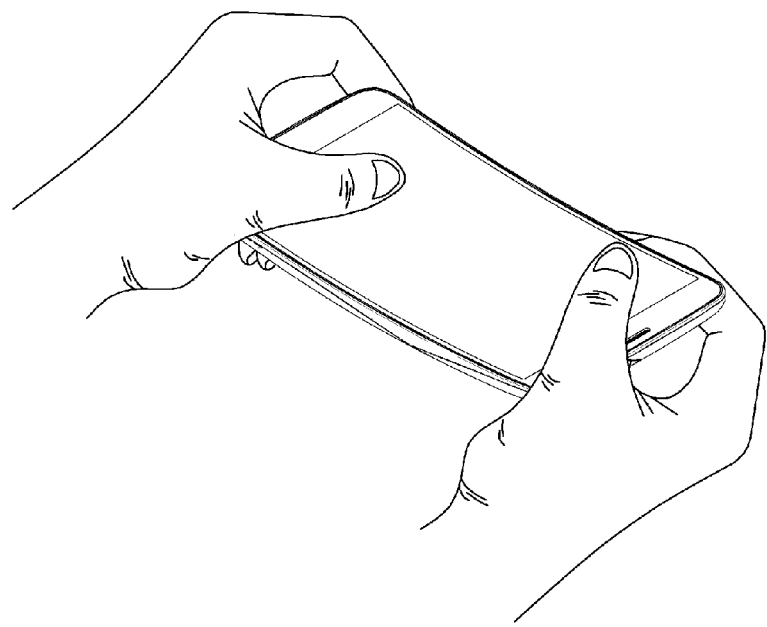
[Fig. 31]
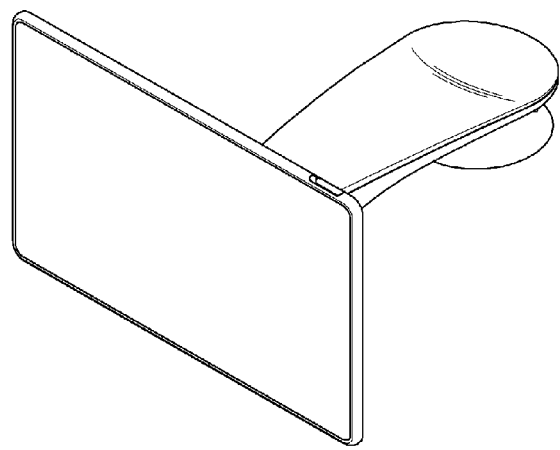

[Fig. 32]

TOUCH WINDOW AND DISPLAY INCLUDING THE SAME

CROSS-REFERENCE TO RELATED PATENT APPLICATIONS

This application is a U.S. National Stage Application under 35 U.S.C. § 371 of PCT Application No. PCT/KR2014/008802, filed Sep. 23, 2014, which claims priority to Korean Patent Application Nos. 10-2013-0117559; and 10-2013-0117560, both filed Oct. 1, 2013; and 10-2014-0008163, filed Jan. 23, 2014, whose entire disclosures are hereby incorporated by reference.

TECHNICAL FIELD

The embodiment relates to a touch window and a display including the same.

BACKGROUND ART

Recently, a touch panel, which performs an input function through the touch of an image displayed on a display device by an input device such as a stylus pen or a hand, has been applied to various electronic appliances.

The touch panel may be typically classified into a resistive touch panel and a capacitive touch panel. In the resistive touch panel, the position of the touch point is detected as short occurs between glass and an electrode due to the pressure by an input device. In the capacitive touch panel, the position of the touch point is detected by detecting the variation of capacitance between electrodes when a finger of the user touches the capacitive touch panel.

The position of the touch point on the touch panel can be detected through various schemes. In particular, recently, a position detection scheme for more precise position detection has been required.

DISCLOSURE OF INVENTION

Technical Problem

The embodiment provides a touch window having improved touch recognition and improved reliability and a display including the same.

Solution to Problem

According to the embodiment, there is provided a touch window including a substrate, and a sensing electrode on the substrate. The sensing electrode includes a plurality of sensing parts having directionalities different from each other.

Advantageous Effects of Invention

The embodiment can provide a novel sensing electrode pattern. Accordingly, the various structures of the touch window can be ensured.

Meanwhile, according to the embodiment, not only when at least two points on the same line in a horizontal direction of the sensing electrode are simultaneously touched, but also when at least two points on the same line in a vertical direction of the sensing electrode are simultaneously touched, the positions of the touched points can be exactly recognized. In other words, even if two points are touched on the same line in the vertical direction, the position of each touch point can be sensed. Accordingly, the accuracy in sensing the position of the touch point can be improved, and the multi-touch can be realized.

In addition, the dummy part can be provided adjacent to the sensing electrode. Accordingly, the pattern of the sensing electrode can be prevented from being recognized, and the optical characteristic and the visibility of the electrode member, the touch window, and the display including the sensing electrode can be improved.

BRIEF DESCRIPTION OF DRAWINGS

FIG. 1 is a plan view schematically showing a touch window according to the embodiment.

FIG. 2 is a plan view showing a touch window according to a first embodiment.

FIGS. 3 to 6 are plan views showing the touch window according to another example of the first embodiment.

FIG. 7 is a plan view showing a touch window according to a second embodiment.

FIGS. 8 to 20 are plan views showing the touch window according to another example of the second embodiment.

FIG. 21 is a plan view showing a touch window according to a third embodiment.

FIGS. 22 to 25 are plan views showing a touch window according to another example of the third embodiment.

FIG. 26 is a sectional view showing a touch window according to the third embodiment.

FIGS. 27 to 28 are sectional views showing a touch device formed by assembling the touch window according to the embodiments with the touch panel.

FIGS. 29 to 32 are sectional views showing examples of the touch device, to which the touch device according to the embodiments is applied.

MODE FOR THE INVENTION

In the following description of the embodiments, it will be understood that, when a layer (or film), a region, a pattern, or a structure is referred to as being "on" or "under" another substrate, another layer (or film), another region, another pad, or another pattern, it can be "directly" or "indirectly" on the other substrate, layer (or film), region, pad, or pattern, or one or more intervening layers may also be present. Such a position of the layer has been described with reference to the drawings.

In the following description, when a predetermined part "includes" a predetermined component, the predetermined part does not exclude other components, but may further include other components if there is no specific opposite description. The thickness and size of each layer shown in the drawings may be exaggerated, omitted or schematically drawn for the purpose of convenience or clarity. In addition, the size of elements does not utterly reflect an actual size. The same reference numbers will be assigned the same elements throughout the drawings.

The thickness and size of each layer (or film), each region, each pattern, or each structure shown in the drawings may be exaggerated, omitted or schematically drawn for the purpose of convenience or clarity. In addition, the size of elements does not utterly reflect an actual size.

Hereinafter, the embodiment of the present invention will be described in detail with reference to accompanying drawings.

Referring to FIG. 1, a touch window 10 according to the embodiment may include a substrate 100.

The substrate 100 may include a cover substrate. In addition, the cover substrate may be additionally provided on the substrate 100.

The substrate 100 may be rigid or flexible. For example, the substrate 100 may include glass or plastic. In detail, the substrate 100 may include chemically tempered glass, such as soda lime glass or aluminosilicate glass, plastic, such as polyethylene terephthalate (PET) or polyimide (PI), or sapphire.

The sapphire has superior electric characteristics, such as permittivity, so that a touch response speed may be remarkably increased and a space touch such as hovering may be easily implemented. The hovering refers to a technology of recognizing coordinates even at a distance slightly spaced apart from a display.

In addition, a portion of the substrate 100 may be curved with a curved surface. In other words, a portion of the substrate 100 may have a flat surface, and another portion of the substrate 100 may be curved with a curved surface. In detail, an end portion of the substrate 100 may be curved with a curved surface or may be curved or bent with a surface having a random curvature.

The substrate 100 may have an active area AA and an unactive area UA defined therein.

An image may be displayed in the active area AA. The image is not displayed in the unactive area UA provided at a peripheral portion of the active area AA.

In addition, the position of an input device (e.g., finger) may be sensed in at least one of the active area AA and the unactive area UA. If the input device, such as a finger, touches the touch window, the variation of capacitance occurs in the touched part by the input device, and the touched part subject to the variation of the capacitance may be detected as a touch point.

The unactive area UA may be provided at one lateral side of the active area AA. For example, the unactive area UA may be provided only at two lateral sides of the active area AA. In detail, the unactive area UA may be only at upper and lower end portions of the active area AA. In other words, the unactive area UA may not be provided at a left lateral side or a right lateral side of the active area AA.

Accordingly, the active area AA serving as a screen area of the touch window may be maximized, and a large screen may be provided for a user. In addition, a design limitation caused by a bezel serving as the unactive area UA can be overcome.

A printing layer may be provided on the unactive area UA. The printing layer may be coated with a material representing a predetermined color so that a wire electrode or a printed circuit board provided on the unactive area UA is not recognized from an outside. The printing layer may have a color suitable for a desired outer appearance. For example, the printing layer may include a black pigment to present a black color. In addition, a desired logo may be formed on the printing layer through various schemes. The printing layer may be formed through a depositing, printing or wet coating scheme.

Hereinafter, the touch window according to the first embodiment will be described with reference to FIGS. 2 to 6.

Referring to FIG. 2, the active area AA of the substrate 100 may be provided thereon with a sensing electrode 200. The sensing electrode 200 may sense the touch by an input device, such as a finger.

The sensing electrode 200 may include first and second sensing electrodes 210 and 220. The first and second electrodes 210 and 220 may be adjacent to each other. The first and second electrodes 210 and 220 may be spaced apart from each other so that the first and second electrodes 210 and 220 may not be overlapped with each other.

The first and second sensing electrodes 210 and 220 may be provided in a longitudinal direction of the substrate 100. The first and second sensing electrodes 210 and 220 may face each other. The first and second sensing electrodes 210 and 220 of the sensing electrode 200 may be provided at left and right sides on the substrate 100.

The first and second sensing electrodes 210 and 220 may be provided on the same surface of the substrate 100. In detail, the first and second electrodes 210 and 220 may be provided on the same one surface of the substrate 100, and spaced apart from each other so that the first and second sensing electrodes 210 and 220 are not overlapped with each other.

Conventionally, in the capacitive touch window, an upper substrate having a first electrode pattern having a first directionality and a lower substrate having a second electrode pattern having a second directionality are spaced apart from each other. Alternatively, an insulator is interposed between the first and second electrode patterns formed one substrate so that the first and second electrode patterns do not make contact with each other. In addition, an electrode wire connected with an electrode pattern is formed on the substrate to transmit the variation of the capacitance, which occurs between the first and second electrode patterns as the input device touches the touch screen, to a controller. Regarding the capacitive touch screen, as the usefulness of multi-touches is recently introduced, the number of electrode patterns is increased, so that the number of the electrode wires is increased.

According to the capacitive touch screen of the related art, the upper and lower substrates are provided separately from each other and the electrode pattern and the electrode wire are formed, or electrodes are insulated from each other by using an insulating material on one substrate, which complicates the structure of the touch screen. In addition, an additional insulator is required to separate the electrode patterns formed on the upper and lower substrates.

In addition, when the electrode pattern and the electrode wire are formed on the upper and lower substrates provided in the form of flat members, a window formed on the upper substrate and touched by the input device maintains a predetermined distance from the electrode pattern, thereby causing the degradation of the touch sensitivity. Therefore, according to the touch window of the embodiment, electrodes, which are formed on one substrate, are spaced apart from each other by using an insulating layer, so that the electrodes are not shorted with respect to each other, and not overlapped with each other. Accordingly, the electrode patterns and the wires can be arranged without complexity, so that the touch sensitivity can be improved.

The first and second sensing electrodes 210 and 220 may have a shape having a length longer than a width. In other words, the first and second sensing electrodes 210 and 220 may have a shape extending in a longitudinal direction of the substrate 100.

The first and second sensing electrodes 210 and 220 may face each other. In other words, the first and second sensing electrodes 210 and 220 may have the same pattern.

An interval G between the first and second sensing electrodes 210 and 220 may be about 10 mm or less. In detail, the interval G may be about 1 mm or less. In more detail, the interval G may be in the range of about 1 μm to about 150 μm. The dead zone of touch recognition can be prevented due to the interval G.

The first and second sensing electrodes 210 and 220 may be provided on the same substrate 100. In other words, the first and second sensing electrodes 210 and 220 may be provided on the same surface of the substrate 100.

The sensing electrode 200 may include a conductive material allowing electricity to flow.

For example, the sensing electrode 200 may include a transparent conductive material allowing electricity to flow without the interruption of light transmission. For example, the sensing electrode may include a metallic oxide, such as indium tin oxide, indium zinc oxide, copper oxide, tin oxide, zinc oxide, or titanium oxide, In addition, the sensing electrode 200 may include nanowire, photosensitive nanowire film, carbon nanotube (CNT), graphene, or conductive polymer.

In addition, the sensing electrode 200 may include various metals. For example, the sensing electrode 200 may include at least one of chromium (Cr), nickel (Ni), copper (Cu), aluminum (Al), silver (Ag), molybdenum (Mo), and the alloy thereof.

In addition, the sensing electrode 200 may be formed in the shape of a mesh. In detail, the sensing electrode 200 may include a plurality of sub-electrodes, and the sub-electrodes may be alternately arranged with each other in the shape of a mesh.

In detail, the sensing electrode 200 may have a mesh line and a mesh opening between mesh lines by the sub-electrodes crossing each other in the shape of a mesh. In this case, the line width of the mesh line may be in the range of about 0.1 μm to about 10 μm. If the line width of the mesh line is less than about 0.1 μm, a mesh line part may not be fabricated. If the line width of the mesh line exceeds about 10 μm, a sensing electrode pattern is recognized by an outside, so that the visibility may be degraded. In addition, the line width of a mesh line LA may be in the range of about 1 μm to about 5 μm. In addition, the line width of the mesh line LA may be in the range of about 1.5 μm to about 3 μm.

In addition, a mesh opening part OA may have various shapes. For example, the mesh opening part OA may have a polygonal shape, such as a square shape, a diamond shape, a pentagon shape, or a hexagonal shape, or a circular shape. In addition, the mesh opening part OA may have a regular shape or a random shape.

As the sensing electrode 200 has the shape of a mesh, the pattern of the sensing electrode may not be viewed on the active area, for example a display area. In other words, even if the sensing electrode 200 is formed of metal, the pattern may be not viewed. In addition, even if the sensing electrode is applied to a large-size touch window, the resistance of the touch window may be lowered.

The first sensing electrode 210 may have a plurality of sensing parts having different directionalities. For example, the first sensing electrode 210 may include first and second sensing parts 211 and 212. The second sensing part 212 may extend from the first sensing part 211.

The first and second sensing parts 211 and 212 may have different directionalities. In detail, the first and second sensing parts 211 and 212 may extend in directions different from each other.

The second sensing part 212 may be bent from the first sensing part 211. The first and second sensing parts 211 and 212 may have a linear shape. As the first and second sensing parts 211 and 212 include linear lines, the first and second sensing parts 211 and 212 may have an L shape.

In addition, the first and second sensing parts 211 and 212 may extend at various angles.

A plurality of first and second sensing parts 211 and 212 may be provided. The first and second sensing parts 211 and 212 may be alternately arranged with each other. The first and second sensing parts 211 and 212 may be alternately and repeatedly arranged with each other.

Meanwhile, wire electrodes 310 and 320 may be formed in the unactive area UA so that the wire electrodes 310 and 320 are electrically connected with the first sensing electrode 210. A plurality of wire electrodes 310 and 320 may be provided.

In other words, the wire electrodes 310 and 320 may include a first wire electrode 310 connected with one end portion of the first sensing electrode 210 and a second wire electrode 320 connected with an opposite end portion of the first sensing electrode 320. Therefore, the first wire electrode 310 may be withdrawn to an upper end of the substrate 100. In addition, the second wire electrode 320 may be withdrawn to a lower end of the substrate 100.

The wire electrodes 310 and 320 may include materials representing superior electric conductivity. For example, the wire electrodes 310 and 320 may include a material the same as or similar to that of the sensing electrode.

An electrode pad (not shown) may be provided at the end portions of the wire electrodes 310 and 320. The electrode pad may be connected with a printed circuit board. In detail, although not shown, a connector is provided on one surface of the printed circuit board, and the electrode pad may be connected with the connector. The electrode pad may have a size corresponding to that of the connector.

The printed circuit board may include various types of printed circuit boards. For example, a flexible printed circuit board (FPCB) may be applied to the printed circuit board.

Meanwhile, the second sensing electrode 220 may include various sensing parts having different directionalities. For example, the second sensing electrode 220 may include third and fourth sensing parts 221 and 222. The fourth sensing part 222 may extend fro the third sensing part 221. The fourth sensing part 222 may extend from the third sensing part 221.

The third sensing part 221 and the fourth sensing part 222 may have mutually different directionalities. In detail, the third sensing part 221 and the fourth sensing part 222 may extend in mutually different directions.

The fourth sensing part 222 may be bent from the third sensing part 221. The third sensing part 221 and the fourth sensing part 222 may have the linear line. Both of the third sensing part 221 and the fourth sensing part 222 include a linear line to form an L shape.

The third sensing part 221 and the fourth sensing part 222 may extend at various angles.

A plurality of the third sensing part 221 and the fourth sensing part 222 may be provided. The third sensing part 221 and the fourth sensing part 222 may be alternately arranged with each other. The third sensing part 221 and the fourth sensing part 222 may be alternately and repeatedly arranged.

In this case, the third sensing part 221 may have the same directionality as that of the first sensing part 211 of the first sensing electrode 210. In addition, the fourth sensing part 222 may have the same directionality as that of the second sensing part 212 of the first sensing electrode 210.

Therefore, the first and second sensing electrodes 210 and 220 may be meshed with each other. In other words, the first and second sensing electrodes 210 and 220 may have complementary shapes to each other. Accordingly, the dead zone of touch recognition can be prevented.

When a touch occurs in the touch window, a signal changed by the resistance and the capacitance provided in the sensing electrode 200 is mutually compared with a reference signal, thereby determining a position of the touch.

In detail, the reference signal may cross the sensing electrode 200 through uniform resistance design in the sensing electrode 200. In other words, the reference signal can cross each of the first and second sensing electrodes 210 and 220 due to uniform resistance. When a touch occurs, voltage variation occurs due to the resistance and the capacitance formed in the sensing electrode 200. In this case, the voltage variation as a function of time is calculated, so that the position of the touch can be calculated. In other words, a time difference for time response is made according to the voltage variation. Accordingly, the changed signal is compared with the reference signal so that the position of the touch can be recognized.

The embodiment may provide a novel sensing electrode pattern. Accordingly, various structure of the touch window can be ensured.

Meanwhile, according to the embodiment, not only when at least two points on the same line in a horizontal direction of the sensing electrode 200 are simultaneously touched, but also when at least two points on the same line in a vertical direction of the sensing electrode 200 are simultaneously touched, the positions of the touched points can be exactly recognized.

In detail, a virtual axis L is defined in a longitudinal direction of the substrate 100, and two points A and B on the same line of the virtual axis L are touched. In this case, the positions of the two points A and B can be detected by a portion of the first sensing electrode 210 and a portion of the second sensing electrode 220. In detail, the touch onto the point A may be sensed by the first sensing electrode 210 on the axis L, and the touch onto the point B may be sensed by the second sensing electrode 220 on the axis L. Accordingly, the touch window according to the embodiment can improve the accuracy in sensing the touch point, and can sense multi-touches.

Hereinafter, a touch window according to another example of the first embodiment will be described with reference to FIGS. 3 to 6, and the details of structures or components the same as or similar to those of the first embodiment will be omitted for clear explanation. FIGS. 3 to 6 are plan views showing the touch window according to another example of the first embodiment.

Referring to FIG. 3, the sensing electrode 210 includes the first sensing part 211 and the second sensing part 221 having directionalities different from each other. The first sensing part 211 and the second sensing part 212 may include curved lines. The second sensing part 221 may extend from the first sensing part 211 while forming a curved line. Accordingly, the first sensing part 211 and the second sensing part 212 may have a curved shape.

Thereafter, referring to FIG. 4, the sensing electrode 210 may include the first sensing part 211 and the second sensing part 212, and the first sensing part 211 and the second sensing part 212 may include linear lines. The first sensing part 211 may form a right angle with the second sensing part 212.

Then, referring to FIG. 5, the touch window may further include a dummy pattern 450. The dummy pattern 450 may be interposed between the first sensing electrode 210 and the second sensing electrode 220. The distance between the dummy pattern 450 and the first sensing electrode 210 and the distance between the dummy pattern 450 and the second sensing electrode 220 may be about 1 mm or less. In addition, the distance between adjacent dummy patterns 450 may be 1 mm or less.

Accordingly, the distance between the first and second sensing electrodes 210 and 220 can prevent the pattern from being recognized. Therefore, the visibility can be improved.

Referring to FIG. 6, the sensing electrode may include the first sensing electrode 210, the second sensing electrode 220 adjacent to the first sensing electrode 210, and a third sensing electrode 230 adjacent to the second sensing electrode 220. In this case, the first to third sensing electrodes 210, 220, and 230 may be inclined in a longitudinal direction of the substrate 100.

In this case, the active area AA and the unactive area UA may be inclined to the longitudinal direction of the substrate 100.

In detail, a virtual axis L is defined in a longitudinal direction of the substrate 100, and three points C, D, and E on the same line of the virtual axis L are touched. In this case, the positions of the three points C, D, and E can be detected by a portion of the first sensing electrode 210, a portion of the second sensing electrode 220, and a portion of the third sensing electrode 230.

In detail, the touch onto the point C may be sensed by the first sensing electrode 210 on the axis L, the touch onto the point D may be sensed by the second sensing electrode 220 on the axis L, and the touch onto the point E may be sensed by the third sensing electrode 230 on the axis L. Accordingly, the touch window according to the embodiment can improve the accuracy in sensing the touch point, and can sense multi-touches.

Hereinafter, a touch window according to another example of the second embodiment will be described with reference to FIGS. 7 to 20. In the following description of the second embodiment, the details of structures or components the same as or similar to those of the first embodiment will be omitted. Hereinafter, the same reference numerals will be assigned to the same components.

Referring to FIG. 7, the sensing electrode 200 may be provided on the active area AA of the substrate 100. The sensing electrode 200 may sense the touch by the input device, such as a finger.

The first sensing electrode 210 may include the first sensing part 211, the second sensing part 212, a division part 410, and a connection part 510.

The first sensing electrode 210 may have a shape having a length longer than a width. In other words, the first sensing electrode 210 may have a shape extending in a longitudinal direction of the substrate 100.

The first and second sensing parts 211 and 212 may be divided from each other by the division part 410. The first and second sensing parts 211 and 212 may face each other in the first sensing electrode 210. One end portion of the first sensing part 211 may be connected with one end portion of the second sensing part 212. In other words, the first and second sensing parts 211 and 212 may be connected with each other by the connection part 510.

The division part 410 may divide the first sensing electrode 210. The division part 410 may divide an inner part of the first sensing electrode 210. The division part 410 may divide a portion of the first sensing electrode 210. Accordingly, the division part 410 may divide the first sensing electrode 210 into the first and second sensing parts 211 and 212.

A line width W of the division part 410 may be about 1 mm or less. For example, the line width W may be in the range of about 1 μm to about 150 μm. In addition, the line width W may be in the range of about 1 μm to about 100 μm. The line width W may be in the range of about 1 μm to about 30 μm. In addition, the line width W may be in the range of about 1 µm to about 10 µm. Accordingly, the dead zone of touch recognition can be prevented due to the line width W.

The division part 410 may be provided across the first sensing electrode 210. The division part 410 may be inclined to the longitudinal direction of the sensing electrode 200. Accordingly, the division part 410 may extend obliquely with respect to the sensing electrode 200.

The division part 410 may expose the top surface of the substrate 100. In other words, the division part 410 may have no material of the first sensing electrode 210.

The connection part 510 is a part included in the first sensing electrode 210, in which the first sensing electrode 210 is not divided. In other words, the connection part 510 is a part in which the first sensing part 211 is connected with the second sensing part 212. The connection part 510 may be provided at an end portion of the division part 410. Accordingly, the first sensing part 211 may be connected with the second sensing part 212 at the end portion of the division part 410.

Meanwhile, the unactive area UA may be provided therein with wire electrodes 310 electrically connecting the first sensing electrodes 210 with each other. A plurality of wire electrodes 310 may be provided.

The wire electrodes 310 may be connected with one end portions of the first sensing electrodes 210. The wire electrodes 310 may be connected with the same end portions of the first sensing electrodes 210. The wire electrodes 310 may be withdrawn in the same direction on the substrate 100.

For example, as shown in FIG. 7, when two wire electrodes 310 are provided, the wire electrodes 310 may include the first and second wire electrodes 311 and 312.

The first and second wire electrodes 311 and 312 may be connected with the same end portion of the first sensing electrode 210. In other words, the first and second wire electrodes 311 and 312 may be connected with one upper end portion of the first sensing electrode 210.

The first and second wire electrodes 311 and 312 may be withdrawn in the same direction on the substrate 100. In other words, the first and second wire electrodes 311 and 312 may be withdrawn to an upper end portion of the substrate 100.

The first wire electrode 311 may be connected with the first sensing part 211. In other words, the first wire electrode 311 may be connected with one end portion of the first sensing part 211. The first wire electrode 311 may be connected with an upper end portion of the first sensing part 211.

The second wire electrode 312 may be connected with the second sensing part 212.

The second wire electrode 312 may be connected with one end portion of the second sensing part 212. The second wire electrode 312 may be connected with an upper end portion of the second sensing part 212.

The second sensing electrode 220 may extend in the same direction as that of the first sensing electrode 210. The second sensing electrode 220 may be spaced apart from the first sensing electrode 210.

Meanwhile, the second sensing electrode 220 may have a shape corresponding to a shape obtained by rotating the first sensing electrode 210 at 180°.

Therefore, similarly to the first sensing electrode 210, the second sensing electrode 220 may include the first sensing electrode 210, the second sensing part 212, a division part 420, and a connection part 520.

The second sensing electrode 220 may have a shape having a length longer than a width. In other words, the second sensing electrode 220 may have a shape extending in a longitudinal direction of the substrate 100.

The first sensing electrode 210 and the second sensing part 212 of the first sensing electrode 220 may be divided into each other by the division part 420. The first sensing part 221 and the second sensing part 222 may face each other in the second sensing electrode 220. One end portion of the first sensing part 221 may be connected with one end portion of the second sensing part 222. In other words, the first sensing part 221 may be connected with the second sensing part 222 by the connection part 520.

The division part 420 may divide the second sensing electrode 220. The division part 420 may divide an inner part of the second sensing electrode 220. The division part 420 may divide a portion of the second sensing electrode 220. Accordingly, the division part 420 may divide the second sensing electrode 220 into the third and fourth sensing parts 211 and 212.

A line width W of the division part 420 may be about 1 mm or less. For example, the line width W may be in the range of about 1 µm to about 150 µm. In addition, the line width W may be in the range of about 1 µm to about 100 µm. The line width W may be in the range of about 1 µm to about 30 µm. In addition, the line width W may be in the range of about 1 µm to about 10 µm. Accordingly, the dead zone of touch recognition can be prevented due to the line width W.

The division part 420 may be provided across the first sensing electrode 210. The division part 420 may be inclined to the longitudinal direction of the sensing electrode 200. Accordingly, the division part 420 may extend obliquely with respect to the sensing electrode 200.

The division part 420 may expose the top surface of the substrate 100. In other words, the division part 420 may have no material of the second sensing electrode 220.

The connection part 520 is a part included in the second sensing electrode 220, in which the second sensing electrode 220 is not divided. In other words, the connection part 520 is a part in which the third sensing part 221 is connected with the fourth sensing part 222. The connection part 520 may be provided at an end portion of the division part 420. Accordingly, the third sensing part 221 may be connected with the fourth sensing part 222 at the end portion of the division part 410.

Meanwhile, the unactive area UA may be provided therein with wire electrodes 320 electrically connecting the sensing electrodes 200 with each other. A plurality of wire electrodes 320 may be provided.

The wire electrodes 320 may be connected with one end portions of the second sensing electrodes 220. The wire electrodes 320 may be connected with the same end portions of the first sensing electrodes 220. The wire electrodes 320 may be withdrawn in the same direction on the substrate 100.

For example, as shown in FIG. 7, when two wire electrodes 320 are provided, the wire electrodes 320 may include first and second wire electrodes 321 and 322.

The first and second wire electrodes 321 and 322 may be connected with the same end portion of the second sensing electrode 220. In other words, the first and second wire electrodes 321 and 322 may be connected with one upper end portion of the first sensing electrode 220.

The first and second wire electrodes 321 and 322 may be withdrawn in the same direction on the substrate 100. In other words, the first and second wire electrodes 321 and 322 may be withdrawn to the upper end of the substrate 100.

The first wire electrode 321 may be connected with the third sensing part 221. In other words, the first wire electrode 321 may be connected with one end portion of the third sensing part 221. The first wire electrode 321 may be connected with an upper end portion of the third sensing part 221.

The second wire electrode 322 may be connected with the fourth sensing part 222. In other words, the second wire electrode 322 may be connected with one end portion of the fourth sensing part 222. The second wire electrode 322 may be connected with an upper end portion of the fourth sensing part 222.

A touch window according to the second embodiment may have a novel sensing electrode pattern. Accordingly, the various structures of the touch window may be ensured.

In detail, according to the second embodiment, not only when at least two points on the same line in a horizontal direction of the sensing electrode 200 are simultaneously touched, but also when at least two points on the same line in a vertical direction of the sensing electrode 200 are simultaneously touched, the positions of the touched points can be exactly recognized.

In other words, when two points A and B on the same vertical line are touched, the positions of the two points A and B can be detected by the third sensing part 212 of the first sensing electrode 210 and the fourth sensing part 221 of the second sensing electrode 220. Accordingly, the touch window according to the embodiment can improve the accuracy in sensing the touch point, and can sense multi-touches.

Hereinafter, a touch window according to another example of the second embodiment will be described with reference to FIGS. 8 to 20, and the details of structures or components the same as or similar to those of the second embodiment will be omitted for clear explanation.

Referring to FIG. 8, sub-division parts 411, 412, 421, and 422 are provided adjacent to division parts 410 and 420. A plurality of sub-division parts 411, 412, 421, and 422 may be provided. For example, the sub-division parts 411, 412, 421, and 422 may include first sub-division parts 411 and 421 and second sub-division parts 412 and 422.

The sub-division parts 411, 412, 421, and 422 may be formed integrally with the division parts 410 and 420. The sub-division parts 411, 412, 421, and 422 may have directionalities different from those of the division parts 410 and 420. In other words, the division parts 410 and 420 may extend in a direction inclined to the longitudinal direction of the sensing electrode 200, and the sub-division parts 411, 412, 421, and 422 may extend in a direction different from those of the division parts 410 and 420. For example, as shown in FIG. 8, the sub-division parts 411, 412, 421, and 422 may extend in a thickness direction of the sensing electrode 200.

The sub-division parts 411, 412, 421, and 422 may be provided at both sides of the division parts 410 and 420. The sub-division parts 411 and 412 may be provided at both sides of the division part 410, and the sub-division parts 421 and 422 may be provided at both sides of the division parts 420. The lengths of the sub-division parts 411, 412, 421, and 422 may be different from each other. In other words, as shown in FIG. 8, the first sub-division parts 411 and 421 provided at both sides of the division part 410 may have lengths different from those of the second sub-division parts 412 and 422 provided at both sides of the division part 420.

The recognition of the touch positions can be improved through the above structure.

Meanwhile, referring to FIG. 9, the first sub-division parts 411 and 421 may have lengths corresponding to those of the second sub-division parts 412 and 422. In other words, the first sub-division parts 411 and 421 and the second sub-division parts 412 and 422 may have the same length.

Meanwhile, referring to FIG. 10, the first sub-division parts 411 and 421 may be offset from each other, and the second sub-division parts 412 and 422 may be offset from each other. In other words, the first sub-division parts 411 and 421 may be offset from each other about the division part 410, and the second sub-division parts 412 and 422 may be offset from each other about the division part 420.

Thereafter, referring to FIG. 11, the first sub-division parts 411 and 421 and the second sub-division parts 412 and 422 may have lengths corresponding to each other and offset from each other. In other words, the first sub-division parts 411 and 421 and the second sub-division parts 412 and 422 may have lengths corresponding to each other and offset from each other.

Referring to FIG. 12, the division parts 410 and 420 may include a plurality of bending parts 410a, 410b, 420a, and 420b. The division parts 410 and 420 may include the bending parts 410a and 420a bent in one direction and the bending parts 410b and 420b bent in an opposite direction. In this case, the bending parts 410a, 410b, 420a, and 420b may be bent at various angles.

Referring to FIG. 13, the division parts 410 and 420 include the bending parts 410a, 410b, 420a, and 420b, and the bending parts 410a, 410b, 420a, and 420b extend in a direction inclined to the longitudinal direction of the sensing electrode 200. In other words, the bending parts 410a, 410b, 420a, and 420b may extend in the inclined direction of the sensing electrode 200.

Referring to FIG. 14, the division parts 410 and 420 include the bending parts 410a, 410b, 420a, and 420b, and the bending parts 410a, 410b, 420a, and 420b extend in a direction inclined to the longitudinal direction of the sensing electrode 200. In other words, the bending parts 410a, 410b, 420a, and 420b may extend in the inclined direction of the sensing electrode 200.

Meanwhile, the bending parts 410a, 410b, 420a, and 420b may be bent at an acute angle or an obtuse angle. In other words, the bending parts 410a, 410b, 420a, and 420b may be bent at various angles other than a right angle.

Referring to FIG. 15, the division parts 410 and 420 include the bending parts 410a, 410b, 420a, and 420b, and the division parts 410 and 420 may have a wedge shape by the shape of the bending parts 410a, 410b, 420a, and 420b.

Referring to FIG. 16, the division parts 410 and 420 may include a plurality of curved parts 410c, 410d, 420c, and 420d. In other words, the division parts 410 and 420 may extend while forming the curved parts 410c, 410d, 420c, and 420d. The curved parts 410c, 410d, 420c, and 420d may include curved lines. In other words, the curved parts 410c, 410d, 420c, and 420d may be curved.

The division parts 410 and 420 may include the curved parts 410c and 420c curved in one direction and the curved parts 410d and 420d curved in an opposite direction. In this case, the curved parts 410c, 410d, 420c, and 420d may be curved at various angles.

Referring to FIG. 17, the division parts 410 and 420 may include a plurality of curved parts 410c, 410d, 420c, and 420d, and the curved parts 410c, 410d, 420c, and 420d extend while being inclined to the longitudinal direction of the sensing electrode 200. In other words, the curved parts 410c, 410d, 420c, and 420d may extend in the inclined direction of the sensing electrode 200.

Referring to FIG. 18, the division parts 410 and 420 may include a plurality of curved parts 410c, 410d, 420c, and 420d, and the curved parts 410c, 410d, 420c, and 420d may extend with various lengths. The curved parts 410c, 410d, 420c, and 420d may irregularly extend.

Referring to FIG. 19, a touch window according to another embodiment further includes dummy patterns 415 and 425. The dummy patterns 415 and 425 may be provided in the division parts 410 and 420. The distance between the dummy patterns 415 and 425 and the sensing electrode 210 may be 1 mm or less. In other words, the distance between the dummy patterns 415 and 425 and the first sensing part 211 or the second sensing part 212 may be about 1 mm or less.

A plurality of dummy patterns 415 or a plurality of dummy patterns 425 are provided in the division part 410 or 420, respectively. In this case, the distance between the dummy patterns 415 or between the dummy patterns 425 may be about 1 mm or less. In other words, the distance between adjacent dummy patterns 415 or between adjacent dummy patterns 425 may be about 1 mm or less.

In addition, a dummy pattern 435 may be interposed between the first and second sensing electrodes 210 and 220. The distance between the dummy pattern 435 and the first sensing electrode 210, and the distance between the dummy pattern 435 and the second sensing electrode 220 may be about 1 mm or less.

Accordingly, the dummy patterns 415, 425, and 435 can prevent the pattern from being recognized due to the division parts 410 and 420 and the distance between the first and second sensing electrodes 210 and 220. Accordingly, the visibility can be improved.

Meanwhile, referring to FIG. 20, the division part 410 of the sensing electrode 210 may include a first division part 413 and a second division part 414. In this case, the first sensing electrode 210 may include the first sensing part 211, the second sensing part 212, and a third sensing part 213. The first sensing part 211 and the second sensing part 212 may be divided from each other by the first division part 413. The second sensing part 212 and the third sensing part 213 may be divided from each other by the second division part 414.

A first connection part 511 may be provided at an end portion of the first division part 413. The first connection part 511 may connect the first sensing part 211 with the second sensing part 212.

A second connection part 512 may be provided at an end portion of the second division part 414. The second connection part 512 may connect the second sensing part 212 with the third sensing part 213.

In this case, the wire 310 may include a first wire 311, a second wire 312, and a third wire 313. The first wire 311 may be connected with the first sensing part 211. The second wire 312 may be connected with the second sensing part 212. The third wire 313 may be connected with the third sensing part 313.

Hereinafter, a touch window according to the third embodiment will be described with reference to FIGS. 21 to 27. Hereinafter, a touch window according to the third embodiment will be described with reference to FIGS. 21 to 27. In the following description of the third embodiment, the details of structures or components the same as or similar to those of the first embodiment will be omitted. Hereinafter, the same reference numerals will be assigned to the same components.

Referring to FIG. 21, the sensing electrode 200 may be formed on the substrate 100. The sensing electrode 200 may sense the touch by the input device, such as a finger. The sensing electrode 200 may have a shape extending in one direction.

Although FIG. 21 shows that the sensing electrode 200 extends in a first direction on the substrate 100, the embodiment is not limited thereto. Therefore, the sensing electrode 200 may extend in a second direction crossing the first direction. In addition, the sensing electrode 200 may include two types of sensing electrodes having shapes extending in the first and second directions, respectively.

Although FIG. 21 shows that the sensing electrode 200 has a bar shape, the embodiment is not limited thereto. Accordingly, the sensing electrode 200 may have various shapes sufficient to sense the touch by the input device, such as a finger.

A distance between the first and second sensing parts 210 and 220 may be about 1 mm or less. For example, a distance G1 may be in the range of about 1 μm to about 150 μm. In addition, the distance G1 may be in the range of about 1 μm to about 100 μm. In addition, the line width G1 may be in the range of about 1 μm to about 30 μm. In addition, the distance G1 may be in the range of about 1 μm to about 10 μm. Accordingly, the patterns of the first and second sensing parts 210 and 220 can be prevented from being recognized, and the optical characteristic and the visibility of the electrode member, the touch window, and the display including the sensing electrode 200 can be improved.

In addition, the wires 310 and 320, which are electrically connected to the first sensing part 210, may be formed in the unactive area UA. A plurality of wires 310 and 320 may be provided.

In other words, the wires 310 and 320 may include a first wire 310 connected with one portion of the first sensing part 210 and a second wire 320 connected with an opposite end portion to one portion of the first sensing part 210. Accordingly, the first wire 310 may be withdrawn to an upper end portion of the substrate 100. In addition, the second wire 320 may be withdrawn to a lower end portion of the substrate 100.

Referring to FIG. 22, a dummy part 250 may be provided adjacent to the sensing electrode 200 in a touch window according to another example of the third embodiment. In detail, the dummy part 250 may be interposed between the first and second sensing parts 210 and 220.

The dummy part 250 may include the same material as that of the sensing electrode 200. Accordingly, the optical characteristic and the visibility of the touch window can be improved through the dummy part 250.

A distance G2 between the sensing electrode 200 and the dummy part 250 may be in the range of about 1 μm to about 150 μm. The distance G2 may be in the range of about 1 μm to about 100 μm. In addition, the distance G2 may be in the range of about 1 μm to about 30 μm. In addition, the distance G2 may be in the range of about 1 μm to about 10 μm. Therefore, the distance G2 between the first sensing part 210 and the dummy part 250 may be in the range of about 1 μm to about 150 μm. The distance G2 between the second sensing part 220 and the dummy part 250 may be in the range of about 1 μm to about 150 μm. Accordingly, the patterns of the sensing electrode 200 and the dummy part 250 can be prevented from being recognized, and the optical characteristic and the visibility of the electrode member, the touch window, and the display including the sensing electrode 200 and the dummy part 250 can be improved.

Although FIG. 22 shows that dummy parts 250 having a quadrangle shape are arranged in one row, the embodiment is not limited thereto. Accordingly, the dummy parts 250 may have various shapes and may be arranged in several numbers.

Referring to FIG. 23, the sensing electrode 200 may have the shape of a mesh.

In this case, the dummy part 250 adjacent to the sensing electrode 200 may include a conductive pattern. In other words, the sensing electrode 200 and the dummy part 250 may have the same pattern or the same shape. In addition, the dummy part 250 may include the same material as that of the sensing electrode 200.

Thereafter, referring to FIG. 24, the first and second sensing parts 210 and 220 may be arranged in a shape in which the first and second sensing parts 210 and 220 are meshed with each other. In detail, the first sensing part 210 may include a concave part 210a, and the second sensing part 220 may include a convex part 220a. In this case, the convex part 220a is provided in the concave part 210a so that the convex part 220a may be provided in the concave part 210a.

Thereafter, the dummy part 250 may be additionally interposed between the first and second sensing parts 210 and 220. In this case, the dummy part 250 may be provided in the concave 210a of the first sensing part 210.

Subsequently, referring to FIG. 26, the substrate 100 may include an intaglio pattern 110a. The intaglio pattern 110a is a part recessed in a concave shape in a depth direction of the substrate 100. The sensing electrode 200 and the dummy part 250 may be arranged in the intaglio pattern 110a. Accordingly, the thickness of the touch window can be reduced.

Hereinafter, a touch device formed by assembling the touch window according to the embodiments described above with the display panel will be described with reference to FIGS. 27 and 28.

Referring to FIGS. 27 and 28, the touch device according to the embodiment may include the touch window formed integrally with a display panel 700. In other words, the substrate to support the sensing electrode may be omitted.

In detail, the sensing electrode may be formed on at least one surface of the display panel 700. The display panel 700 includes first and second substrates 701 and 702. In other words, the sensing electrode may be formed on at least one surface of a first substrate 701 or a second substrate 702.

If the display panel 700 is a liquid crystal display panel, the display panel 700 may have a structure in which the first substrate 701 including a thin film transistor (TFT) and a pixel electrode is combined with the second substrate 702 including color filter layers while a liquid crystal layer is interposed between the first and second substrates 701 and 702.

Further, the display panel 700 may be a liquid crystal display panel having a color filter on transistor (COT) structure formed by combining the first substrate 701 formed thereon with the TFT, a color filter, and a black matrix with the second substrate 702 while the liquid crystal layer is interposed between the first and second substrates 701 and 702. In other words, the TFT may be formed on the first substrate 701, a protective layer may be formed on the TFT, and the color filter layer may be formed on the protective layer. In addition, the pixel electrode, which makes contact with the TFT, is formed on the first substrate 701. In this case, to improve an aperture ratio and simplify a mask process, the black matrix may be omitted, and a common electrode may perform a function of the black matrix together with the inherent function thereof.

In addition, if the display panel 700 is a liquid crystal panel, the display device may further include a backlight unit to supply light onto a rear surface of the display panel 700.

If the display panel 700 is an organic light emitting display panel, the display panel 700 includes a self-emissive device that does not require an additional light source. The display panel 700 includes the TFT formed on the first substrate 701 and an organic light emitting device making contact with the TFT. The organic light emitting device may include an anode, a cathode, and an organic light emitting layer interposed between the anode and the cathode. In addition, the display panel 700 may further include the second substrate 702 formed on the organic light emitting device and serving as an encapsulation substrate for encapsulation.

In this case, at least one sensing electrode may be formed on a top surface of an upper substrate. Although drawings show that the sensing electrode is formed on the top surface of the second substrate 702, when the first substrate 701 serves as the upper substrate, at least one sensing electrode may be formed on the top surface of the first substrate 701.

Referring to FIG. 27, the sensing electrode 200 may be formed on the top surface of the display panel 700. In addition, a wire connected with the sensing electrode 200 may be formed on the top surface of the display panel 700. An adhesive layer 60 is provided on the display panel 700 having the sensing electrode 200, and a cover substrate 400 may be provided on the resultant structure.

Referring to FIG. 28, the display panel includes the first and second substrates 701 and 702, and the sensing electrode 200 is interposed between the first and second substrates 701 and 702. In other words, the sensing electrode may be formed on at least one surface of the first substrate 701 or the second substrate 702.

Although FIGS. 27 and 28 show the touch window formed integrally with the display panel, the embodiment is not limited thereto. In other words, the touch window according to the embodiments is provided on the display panel, and the touch window may be bonded to the display panel through an adhesive layer.

Hereinafter, one example of a touch device to which the touch window according to the embodiments described above is applied will be described with reference to FIGS. 29 to 32.

Referring to FIG. 29, a mobile terminal 1000 is shown as one example of the touch device. The mobile terminal 1000 may include an active area AA and an unactive area UA. The active area AA may sense a touch signal through the touch by a finger, and a command icon pattern part and a logo may be formed in the unactive area UA.

Referring to FIG. 30, the touch window may include a flexible touch window that is bendable. Accordingly, the touch device including the touch window may be a flexible touch device. Accordingly, a user can curve or bend the flexible touch window with a hand.

Referring to FIG. 31, the touch window may be applied to a vehicle navigation system as well as a touch device of the mobile terminal.

In addition, referring to FIG. 32, the touch panel may be applied to an inner part of a vehicle. In other words, the touch panel may be applied to various parts in the vehicle. Accordingly, the touch panel may be applied to a dashboard as well as a PND (Personal Navigation Display), so that a CID (Center Information Display) may be realized. However, the embodiment is not limited to the above, and the display device may be used for various electronic appliances.

Any reference in this specification to "one embodiment," "an embodiment," "example embodiment," etc., means that a particular feature, structure, or characteristic described in connection with the embodiment is included in at least one embodiment of the invention. The appearances of such phrases in various places in the specification are not necessarily all referring to the same embodiment. Further, when a particular feature, structure, or characteristic is described in connection with any embodiment, it is submitted that it is within the purview of one skilled in the art to effect such feature, structure, or characteristic in connection with other ones of the embodiments.

Although embodiments have been described with reference to a number of illustrative embodiments thereof, it should be understood that numerous other modifications and embodiments can be devised by those skilled in the art that will fall within the spirit and scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

The invention claimed is:

1. A touch window comprising:
a substrate;
a sensing electrode on the substrate; and
at least one wire electrode connected with a first end of the sensing electrode,
wherein the sensing electrode includes first and second sensing electrodes adjacent to each other,
wherein the first sensing electrode is spaced apart from the second sensing electrode,
wherein each of the first and second sensing electrodes includes a first sensing part and a second sensing part extending from the first sensing part, and the first and second sensing parts have directionalities different from each other,
wherein the at least one wire electrode includes a first wire connected with the first end of the first sensing electrode and a second wire connected with a second end of the first sensing electrode,
wherein the first sensing part of the first sensing electrode and the first sensing part of the second sensing electrode face each other and extend in a first direction,
wherein the second sensing part of the first sensing electrode and the second sensing part of the second sensing electrode face each other and extend in a second direction different from the first direction, and
wherein when the touch window receives a touch input, the touch window determines a position of the touch input through a voltage variation that is calculated according to a resistance and a capacitance formed in the sensing electrode.

2. The touch window of claim 1, wherein the first and second sensing parts of each of the first and second sensing electrodes are alternately and repeatedly arranged.

3. The touch window of claim 1, wherein
a virtual axis is defined in a longitudinal direction of the substrate, and
a portion of the first sensing electrode and a portion of the second sensing electrode are provided on the virtual axis.

4. The touch window of claim 3, further comprising a dummy pattern interposed between the first and second sensing electrodes.

5. The touch window of claim 4, wherein the sensing electrode comprises a material identical to a material constituting the dummy pattern.

6. The touch window of claim 1, wherein the first sensing electrode is meshed with the second sensing electrode.

7. The touch window of claim 1, wherein the first sensing electrode has a shape identical to a shape of the second sensing electrode.

8. The touch window of claim 1, wherein a surface area of the first sensing electrode corresponds to a surface area of the second sensing electrode.

9. A touch window comprising:
a substrate;
a sensing electrode on the substrate; and
at least one wire electrode connected with a first end of the sensing electrode,
wherein the sensing electrode comprises first and second sensing electrodes, and the first and second sensing electrodes extend in a longitudinal direction of the substrate,
wherein the at least one wire electrode includes a first wire connected to a first end of the first sensing electrode and a second wire connected to a first end of the sensing electrode,
wherein each of the first and second sensing electrodes includes first and second sensing parts divided from each other by a division part,
wherein the division part exposes a top surface of the substrate and is inclined in a longitudinal direction of the substrate, and
wherein, when the touch window receives a touch input, the touch window determines a position of the touch input through a voltage variation that is calculated according to a resistance and a capacitance formed in the sensing electrode.

10. The touch window of claim 9, wherein a distance between the first and second sensing electrodes is in a range of 0.1 mm to 10 mm.

11. The touch window of claim 9, wherein the division part has a line width in a range of 0.1 mm to 10 mm.

12. The touch window of claim 9, further comprising a connection part to connect the first sensing part of the first sensing electrode with the second sensing part of the first sensing electrode.

13. The touch window of claim 12, wherein the connection part is provided at an end of the division part, and the first sensing part is connected to the second sensing part at the end of the division part.

14. The touch window of claim 9, further comprising a sub-division part formed integrally with the division part, and provided in a direction different from a direction of the division part.

15. The touch window of claim 9, further including a dummy pattern provided between the first sensing electrode and the second sensing electrode, wherein the sensing electrode includes a material identical to a material constituting the dummy pattern.

16. The touch window of claim 9, wherein the first sensing part is meshed with the second sensing part.

17. The touch window of claim 9, further including a dummy pattern provided in the division part, wherein a distance between the dummy pattern and the first sensing part, and a distance between the dummy pattern and the second sensing part are 1 mm or less.

* * * * *